US009144225B1

(12) United States Patent
Gaccione et al.

(10) Patent No.: US 9,144,225 B1
(45) Date of Patent: Sep. 29, 2015

(54) ELEVATIONALLY-ADJUSTABLE PET FEEDING AND WATER BOWL HOLDERS

(71) Applicants: Barbara Gaccione, Tampa, FL (US); Karen Oberst, Tampa, FL (US)

(72) Inventors: Barbara Gaccione, Tampa, FL (US); Karen Oberst, Tampa, FL (US)

(*) Notice: Subject to any disclaimer, the term of this patent is extended or adjusted under 35 U.S.C. 154(b) by 0 days.

(21) Appl. No.: 14/543,987

(22) Filed: Nov. 18, 2014

(51) Int. Cl.
*A01K 5/01* (2006.01)
*A01K 5/00* (2006.01)

(52) U.S. Cl.
CPC ............. *A01K 5/00* (2013.01); *A01K 5/0114* (2013.01)

(58) Field of Classification Search
CPC ..................................... A01K 5/0114
USPC ............................. 119/61.5, 61.57
See application file for complete search history.

(56) References Cited

U.S. PATENT DOCUMENTS

| 3,392,959 | A | * | 7/1968 | Lewis | 254/103 |
| 3,844,535 | A | * | 10/1974 | Dorough, Jr. | 254/103 |
| 4,976,223 | A | | 12/1990 | Pierce | |
| 5,054,431 | A | * | 10/1991 | Coviello | 119/61.56 |
| 5,584,263 | A | | 12/1996 | Sexton | |
| 6,622,653 | B1 | | 9/2003 | Starnes, Jr. | |
| 7,318,391 | B2 | | 1/2008 | Brillon | |
| 8,082,883 | B2 | | 12/2011 | Aletti | |
| D682,483 | S | | 5/2013 | Silverman | |
| 8,479,686 | B2 | | 7/2013 | Johnson | |
| D695,974 | S | * | 12/2013 | Young | D30/133 |
| 8,776,725 | B1 | * | 7/2014 | Grijalva | 119/61.57 |

FOREIGN PATENT DOCUMENTS

CA 2646215 A1 6/2010

* cited by examiner

*Primary Examiner* — Kristen C Hayes
(74) *Attorney, Agent, or Firm* — Kyle A. Fletcher, Esq.

(57) ABSTRACT

The elevating and adjustable pet feeding and water bowl is a feeding and watering station for pets. The elevating and adjustable pet feeding and water bowl is a system for raising and lowering bowls from ground level to counter level, which is helpful for pet owners with physical limitations.

16 Claims, 6 Drawing Sheets

ELEVATIONALLY-ADJUSTABLE PET FEEDING AND WATER BOWL HOLDERS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pets and pet supplies, more specifically, a feeding accessory for raising and lower the elevation of feeding and watering bowls.

SUMMARY OF INVENTION

The elevating and adjustable pet feeding and water bowl is a feeding and watering station for pets. The elevating and adjustable pet feeding and water bowl provides a system for raising and lowering bowls from a ground level to a counter level, which allows pet owners with physical limitations to easily raise bowls to counter level providing easy access to maintain appropriate levels of food and water for pets. In addition, the elevation mechanism allows pet owners to put feed and water bowls at a height appropriate to the size of the pet. The elevating and adjustable pet feeding and water bowl is comprised of a base, one or more elevation columns, and one or more feeding platforms.

These together with additional objects, features and advantages of the elevating and adjustable pet feeding and water bowl will be readily apparent to those of ordinary skill in the art upon reading the following detailed description of the presently preferred, but nonetheless illustrative, embodiments when taken in conjunction with the accompanying drawings.

In this respect, before explaining the current embodiments of the elevating and adjustable pet feeding and water bowl in detail, it is to be understood that the elevating and adjustable pet feeding and water bowl is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the elevating and adjustable pet feeding and water bowl.

It is therefore important that the claims be regarded as including such equivalent construction insofar as they do not depart from the spirit and scope of the elevating and adjustable pet feeding and water bowl. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
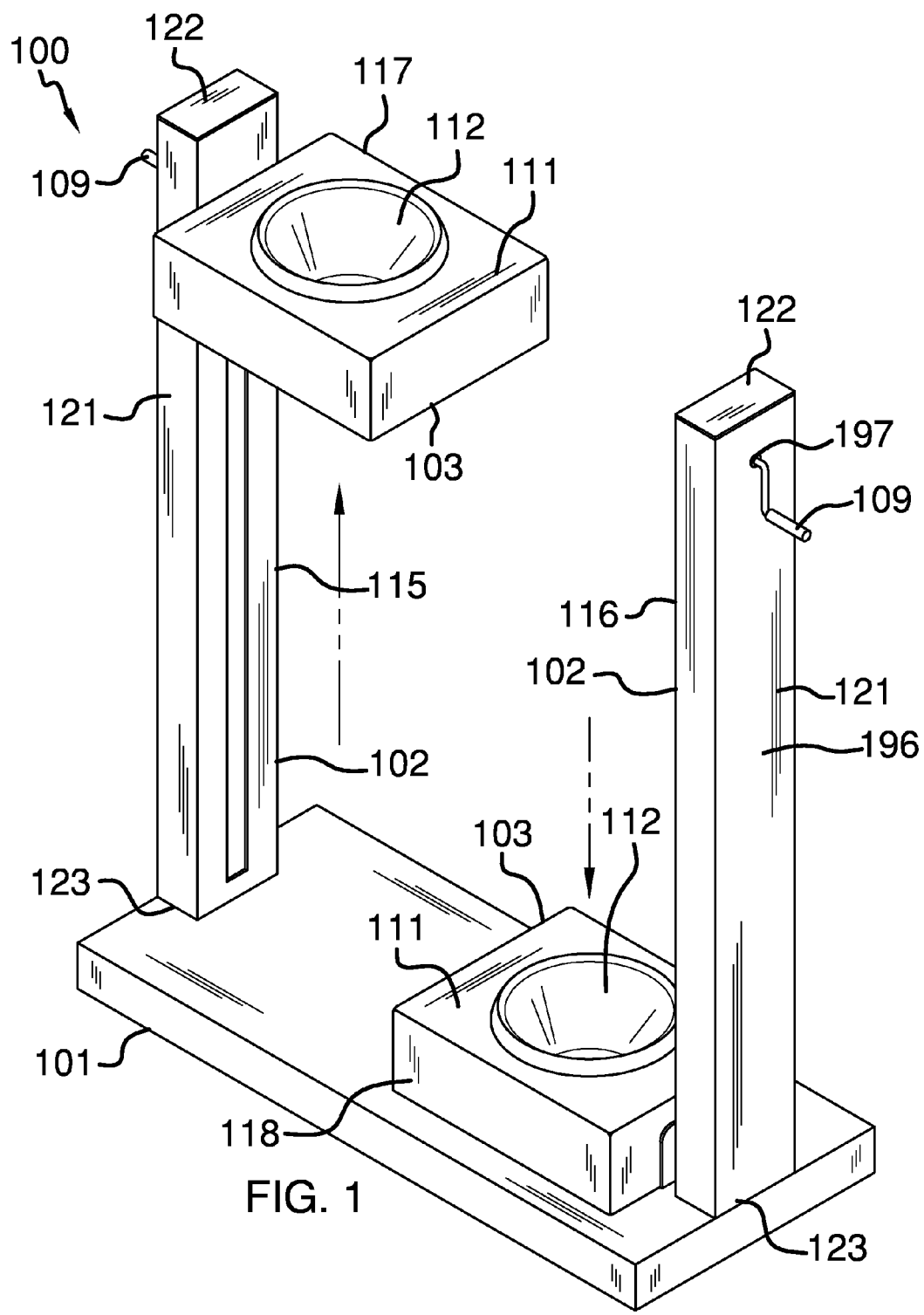
FIG. 1 is a perspective view of an embodiment of the disclosure.
Figure 2:
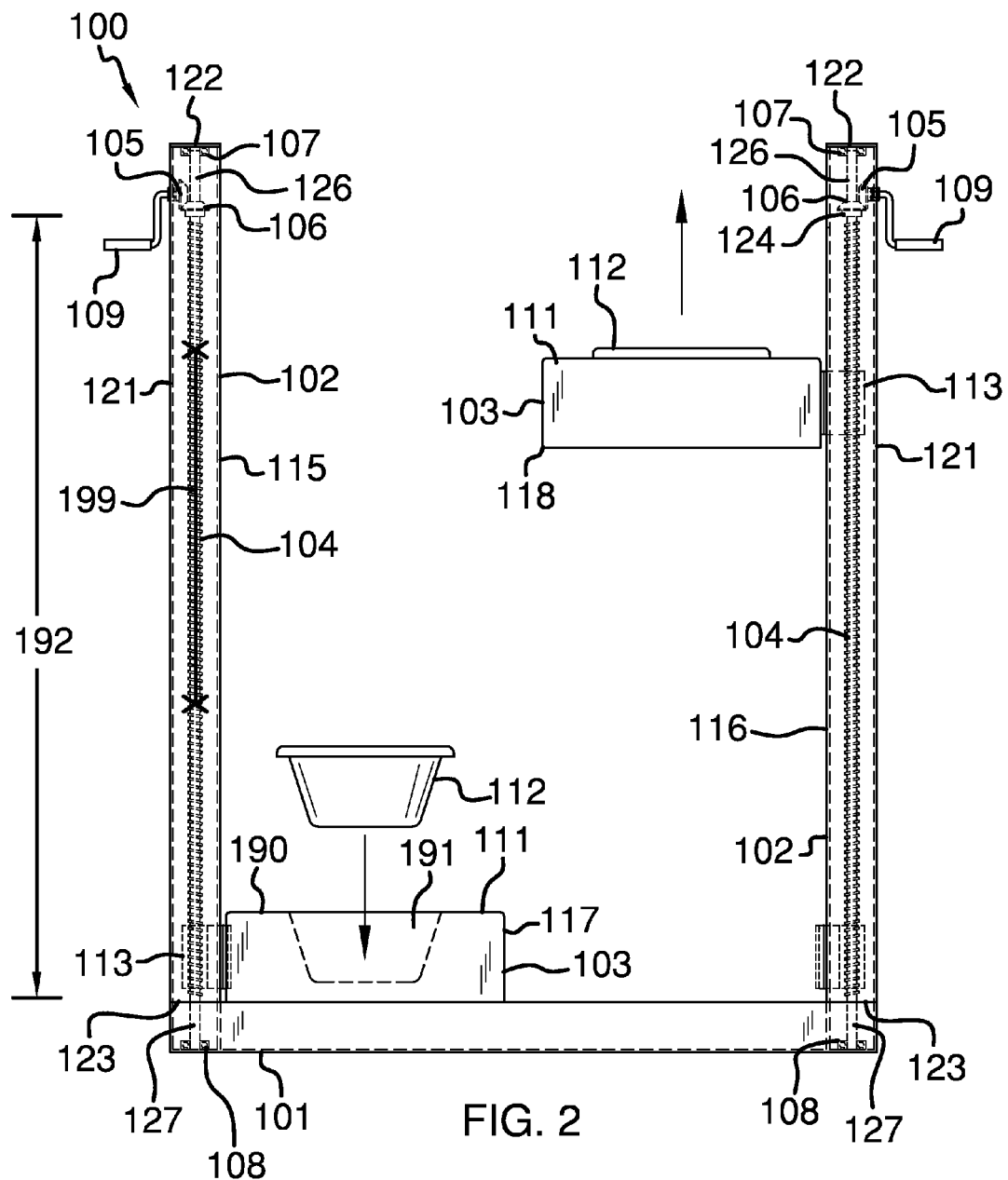
FIG. 2 is a front detailed view of an embodiment of the disclosure.
Figure 3:
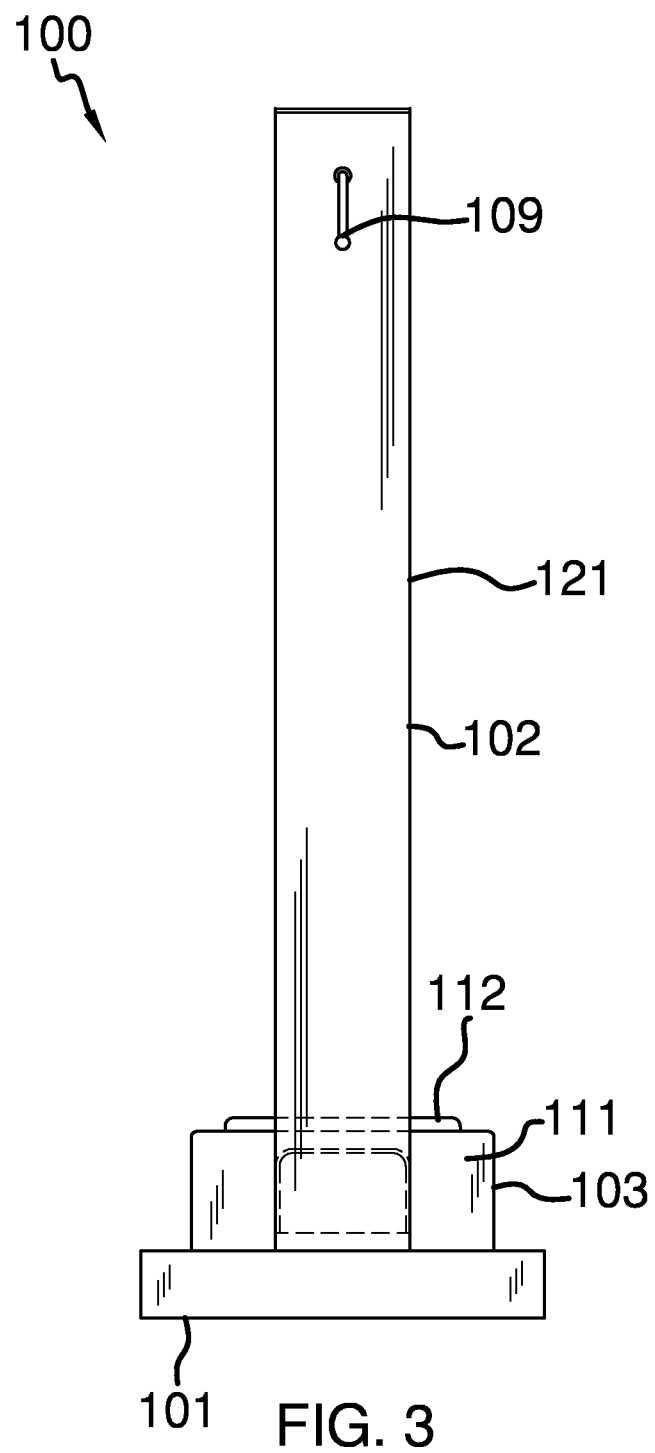
FIG. 3 is a side view of an embodiment of the disclosure.
Figure 4:
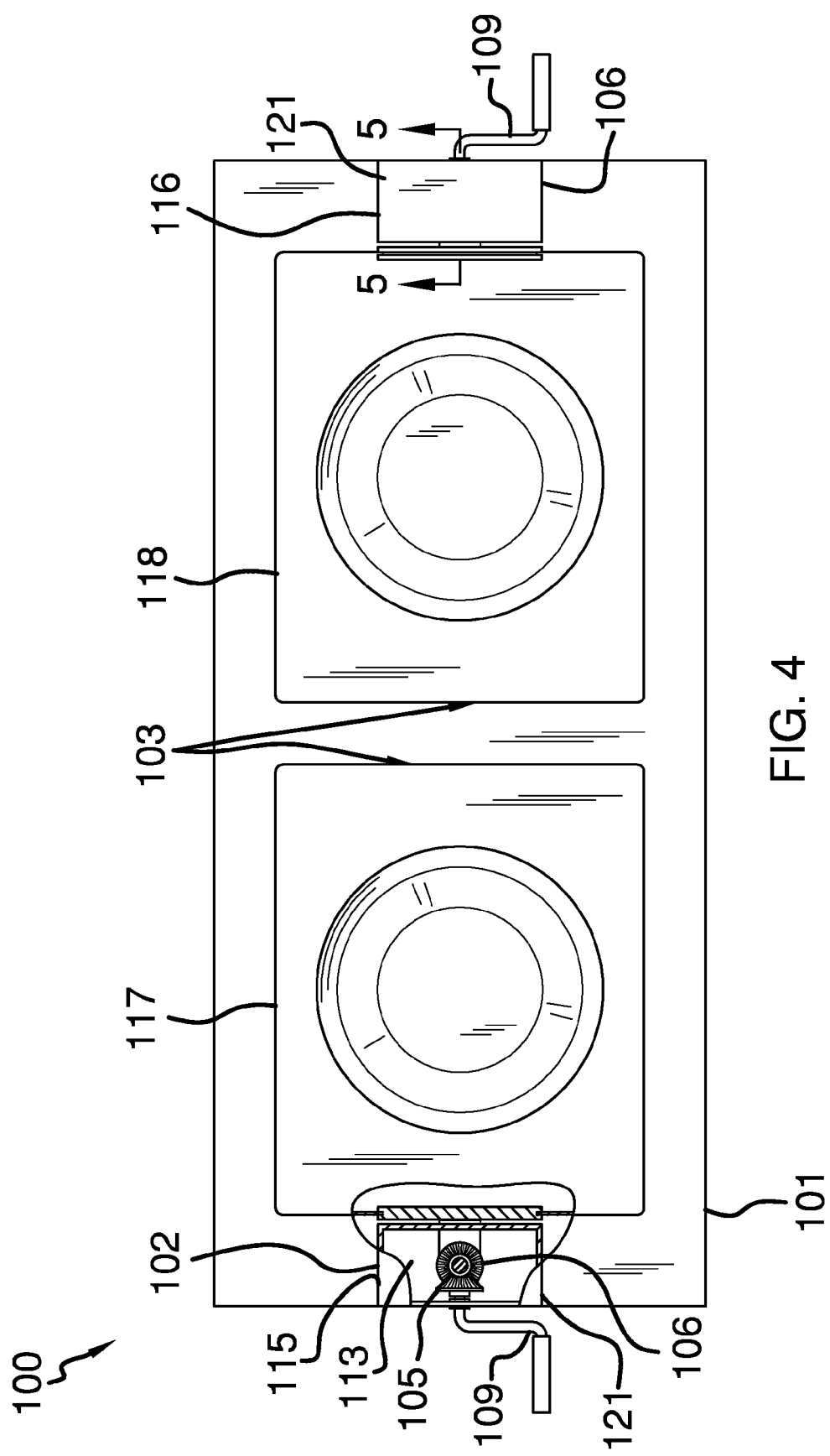
FIG. 4 is a top cut-away view of an embodiment of the disclosure.
Figure 5:
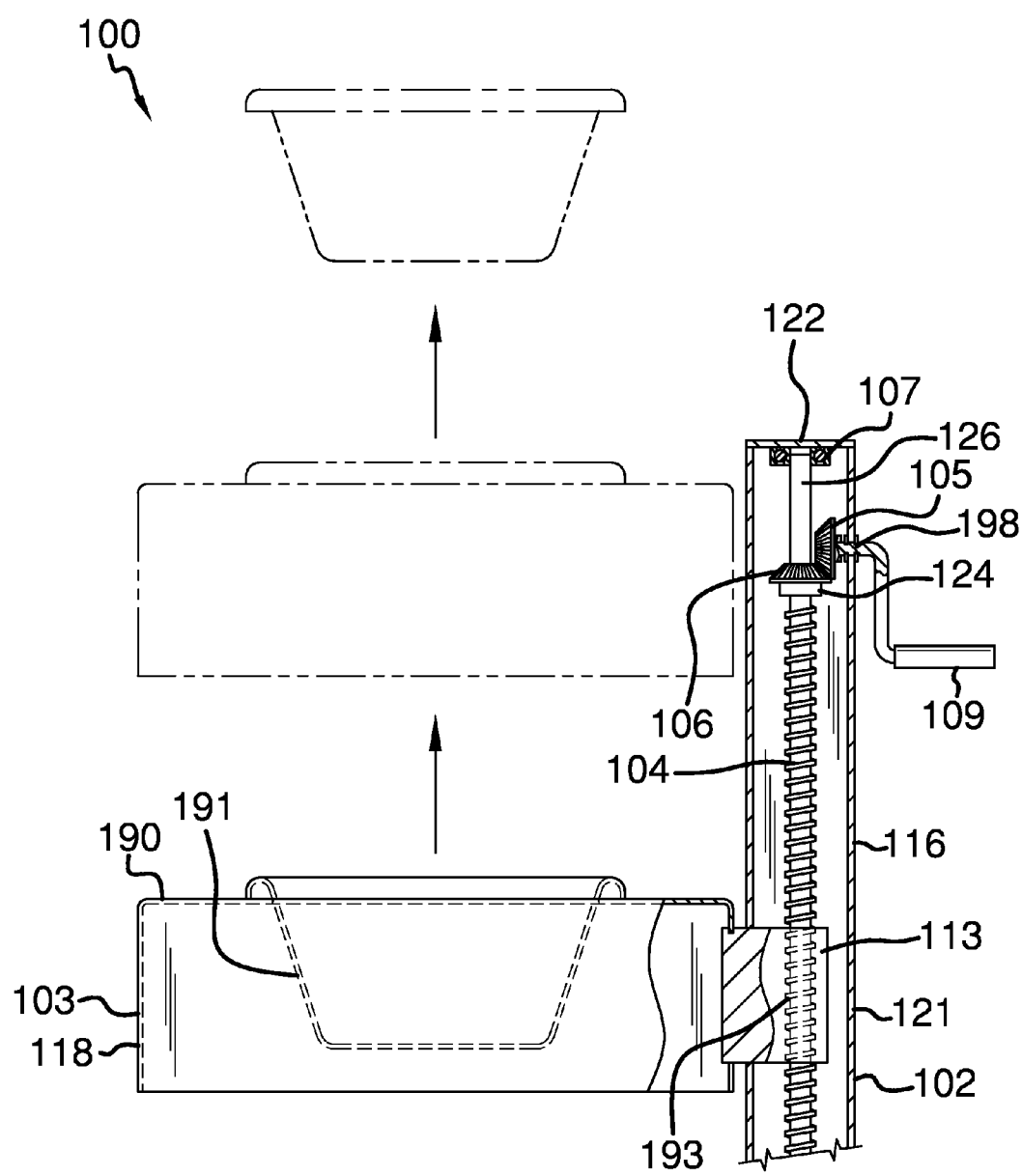
FIG. 5 is a close-up cut-away view of an aspect of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As illustrated in FIGS. 1-6, the elevating and adjustable pet feeding and water bowl 100 (hereinafter invention) is comprised of one or more elevation columns 102, one or more feeding platforms 103, and a base 101.

Each elevation column 102 is comprised of a worm member 104, a first bevel gear 105, a second bevel gear 106, a first bearing 107, a second bearing 108, a crank handle 109 and an elevation column housing 121. The worm member 104 is a gear in the form of a cylinder or shaft formed with a screw thread around a shaft's perimeter. Worm gears are well known in the art of mechanical systems. Upon rotation of the worm member 104, a center axis 199 of the worm member 104 will interact with a worm collar 113 in order to raise or lower a corresponding feeding platform 103.

The second bevel gear 106 is fitted over the worm member 104. The second bevel gear 106 is held in place by a collar 124 mounted on the worm member 104. The first bevel gear 105 is mounted on a crankshaft 198 of the crank handle 109. The first bevel gear 105 is in mechanical engagement with the second bevel gear 106. Moreover, both the first bevel gear 105 and the second bevel gear 106 include teeth that enable mechanical rotation to be transferred between one another. The rotation of the crank handle 109 transfers rotational movement of the worm member 104 via the first bevel gear 105 to the second bevel gear 106. Specifically, turning the crank handle 109 will rotate the first bevel gear 105, which rotates the second bevel gear 106, which in turn rotates the worm member 104. In an alternative embodiment, the crank handle 109 is replaced with a crank motor 110. The crank motor 110 includes associated switches 119 as well as an electrical power source 120 (see FIG. 6) in order to operate the crank motor 110.

The worm member 104 is mounted in an elevation column housing 121 using the first bearing 107 and the second bearing 108. The first bearing 107 is secured to a top surface 122 of the elevation column housing 121; whereas the second bearing 108 is secured to a bottom surface 123 of the elevation column housing 121. The bottom surface 123 of the elevation column housing 121 is attached to the base 101. The top surface 122 of the elevation column housing 121 is located distal to the bottom 123 of the elevation column housing 121. The first bearing 107 and the second bearing 108 are identical and are parallel with one another. Moreover, the first bearing 107 and the second bearing 108 receive worm member 104 therein, and enable the worm member 104 to rotate about the center axis 199. A first end 126 of the worm member 104 is mounted to the first bearing 107, and a second end 127 of the worm member 104 is mounted to the second bearing 108.

All the elements of the elevation column 102, including the worm member 104, the first bevel gear 105, the second bevel gear 106, the first bearing 107, the second bearing 108, and the crank handle 109, are mounted within or on the elevation column housing 121. The elevation column housing 121 is essentially in the shape of a hollow rectangular block. A hole 197 is cut into a first side 196 of the elevation column housing 121 to allow the crankshaft 198 of the crank handle 109 to pass from outside the elevation column housing 121 to the first bevel gear 105.

A rectangular shaped cutout 195 is removed from a second side 194 of the elevation column housing 121. The rectangular shaped cutout 195 allows exterior access of the worm collar 113 to the feeding platform 103, and allows the feeding platform 103 and worm collar 113 to move freely along the elevation column 102 when the invention 100 is in use.

Figure 6:
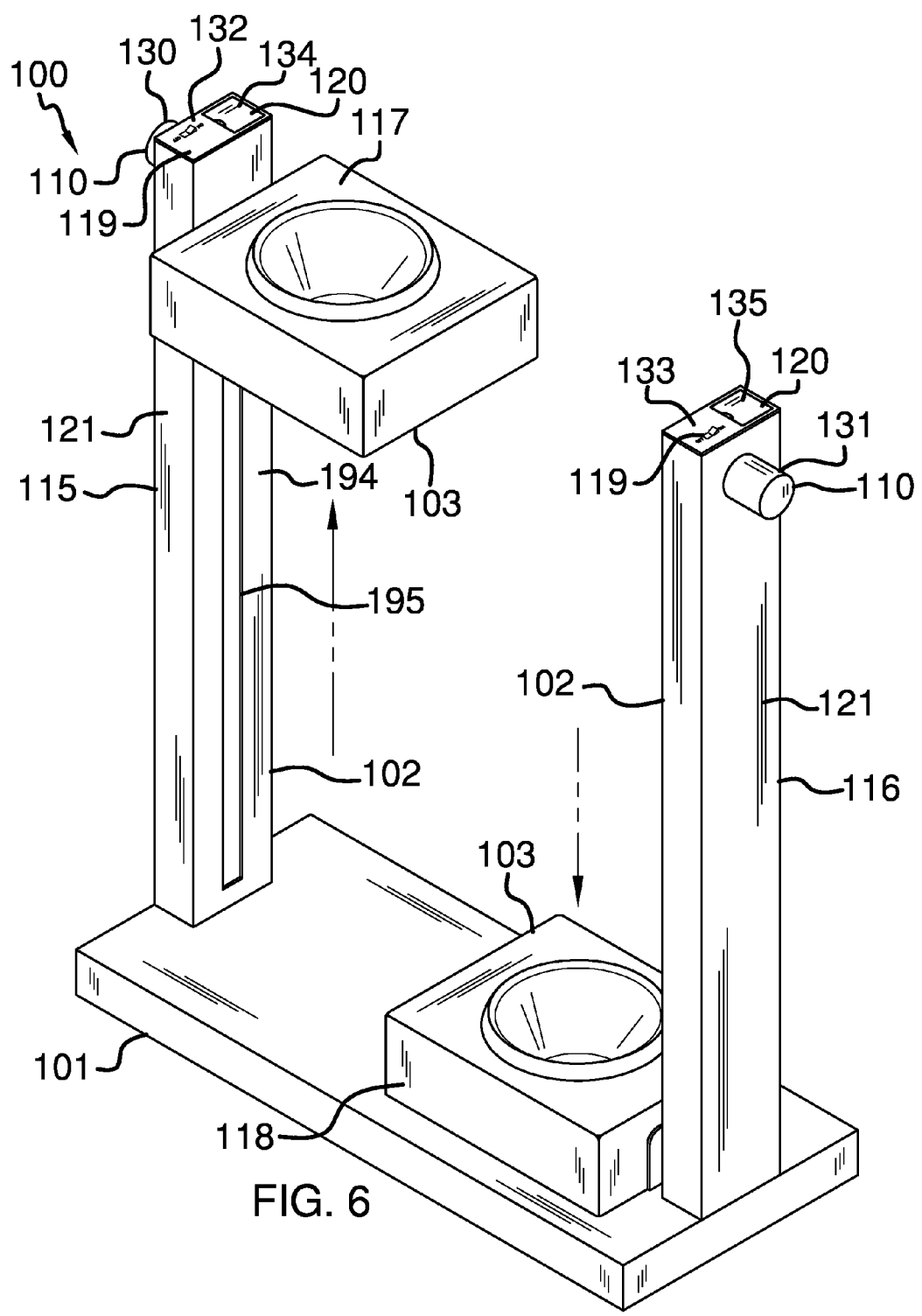
FIG. 6 is a view of an alternate embodiment of the disclosure.

The elevation columns 102 may be further defined as a first elevation column 115 and a second elevation column 116. The first elevation column 115 is parallel with the second elevation column 116. The first elevation column 115 mirrors the second elevation column 116. Referring to FIG. 6, the first elevation column 115 includes a first crank motor 130. The second elevation column 116 includes a second crank motor 131. The first crank motor 130 is supported and operated with a first set of electrical switches 132 and receives electrical power from a first set of batteries located in a first battery compartment 134. The second crank motor 131 is supported and operated with a second set of electrical switches 133 and receives electrical power from a second set of batteries located in a second battery compartment 135.

Each individual feeding platform 103 is comprised of worm collar 113, a bowl stand 111 and a bowl 112. The worm collar 113 has an internally threaded hole 193 that is tapped with and corresponds to the worm member 104. When in use the worm collar 113 fits over the worm member 104 and when the worm member 104 rotates, the feeding platform 103 moves with the worm collar 113 along a worm length 192 of the worm member 104.

The worm collar 113 is attached to the bowl stand 111. The bowl stand 111 is a shell that is shaped in the form of a rectangular block. A bowl recess 191 is removed from a top bowl stand surface 190 of the bowl stand 111 to receive and support a bowl 112. The feeding platforms 103 may be further defined as a first feeding platform 117 and a second feeding platform 118.

The base 101 provides the structural elements to support the invention 100. The base 101 is in the shape of a rectangular block. The elevation columns 102 are attached to the base 101. Moreover, the one or more elevation columns 102 extend vertically with respect to the base 101.

The materials used to make the worm member 104, the first bevel gear 105, the second bevel gear 106, the first bearing 107, the second bearing 108, the crank handle 109 and the elevation column housing 121 can be, but are not limited to, hard plastic or metal. The worm member 104, the first bevel gear 105, the second bevel gear 106, the crank handle 109 and the elevation column housing 121 are all formed out of molded plastic. The first bearing 107 and the second bearing 108 are commercially available metal bearings. The elevation column housing 121 is formed with brackets to hold the first bearing 107 and second bearing 108. The first bevel gear 105 is screwed into the crank handle 109. The second bevel gear 106 and collar 124 are directly formed as part of the worm member 104.

The material used to make the worm collar 113 can be, but is not limited to, hard plastic or metal. The worm collar 113 is formed from a first piece and a second piece that are both molded out of hard plastic. The bowl stand 111 can be made from, but is not limited to, metal, hard plastic, or food grade plastic. The bowl stand 111 is formed as a single piece from hard plastic and is secured to the worm collar 113 using nuts and bolts. The bowl 112 can be made from, but is not limited to, food grade plastic or metal. The bowl 112 is formed as a single piece of food grade plastic. The base 101 can be made from, but is not limited to, metal or hard plastic. The base 101 is formed as a single piece from hard plastic and is secured to the elevation columns 102 using nuts and bolts.

To use the invention 100, the user turns the crank handle 109, or, if available, the crank motor 110, to raise the feeding platform 103 to counter level. Once the feeding platform 103 is at counter level, the bowl 112 can be filled. The user can then lower the feeding platform 103 back into a position to allow for use by pets.

It should be remembered that the above detailed description is merely exemplary in nature and is not intended to limit the described embodiments of the application or uses of the described embodiments. Specifically, it is noted that drive systems other than the worm drive described above could be used to raise the feeding platforms 103. For example, the worm could be replaced with by attaching the crank handle 109 to a winch that would raise or lower wire, cord or some other line attached to the worm collar. In this example the worm collar could be wrapped around a simple taut line, or it could be fitted as a cylinder in a larger tube to hold the worm collar in its track. It is also noted that a feeding platform could be modified to receive a two bowls.

With respect to the above description, it is to be realized that the optimum dimensional relationship for the various components of the invention described above and in FIGS. 1 to 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An elevationally-adjustable feeding station for pets comprising:
   wherein one or more elevation columns extend vertically from a base;
   wherein each of the one or more elevation columns is provided with a feeding platform that is able to be adjusted elevationally;
   wherein each of the one or more elevation columns is comprised of a worm member that is rotated via a crank handle or optionally a crank motor in order to adjust an elevation of a worm collar provided on the feeding platform;
   wherein the crank motor includes associated switches as well as an electrical power source in order to operate the crank motor;
   wherein each of the one or more elevation columns includes an elevation column housing;
   wherein the worm member is mounted in the elevation column housing using a first bearing and a second bearing; wherein the first bearing is secured to a top surface of the elevation column housing; wherein the second bearing is secured to a bottom surface of the elevation column housing.

2. The feeding station according to claim 1 wherein each of the one or more elevation columns includes a first bevel gear, a second bevel gear, the first bearing, the second bearing, the crank handle, and, the elevation column housing.

3. The feeding station according to claim 2 wherein the worm member rotates about a center axis, and which interacts with said worm collar in order to raise or lower the feeding platform.

4. The feeding station according to claim 3 wherein the second bevel gear is fitted over the worm member; wherein the second bevel gear is held in place by a collar mounted on the worm member.

5. The feeding station according to claim 4 wherein the first bevel gear is mounted on a crankshaft of the crank handle; wherein the first bevel gear is in mechanical engagement with the second bevel gear; wherein both the first bevel gear and the second bevel gear enable mechanical rotation to be transferred between one another.

6. The feeding station according to claim 5 wherein the rotation of the crank handle transfers rotational movement of the worm member via the first bevel gear to the second bevel gear, and which in turn rotates the worm member.

7. The feeding station according to claim 6 wherein a bottom surface of the elevation column housing is attached to the base; wherein the top surface of the elevation column housing is located distal to the bottom of the elevation column housing.

8. The feeding station according to claim 7 wherein the first bearing and the second bearing are identical and are parallel with one another; wherein the first bearing and the second bearing receive the worm member therein, and enable the worm member to rotate about the center axis.

9. The feeding station according to claim 8 wherein a first end of the worm member is mounted to the first bearing, and a second end of the worm member is mounted to the second bearing.

10. The feeding station according to claim 9 wherein the elevation column housing includes a hole that is located on a first side of the elevation column housing to allow a crankshaft of the crank handle to pass from outside the elevation column housing to the first bevel gear.

11. The feeding station according to claim 10 wherein a rectangular shaped cutout is removed from a second side of the elevation column housing; wherein the rectangular shaped cutout allows exterior access of the worm collar to the feeding platform, and allows the feeding platform and worm collar to move freely along the elevation column.

12. The feeding station according to claim 11 wherein the elevation columns are further defined as a first elevation column and a second elevation column; wherein the first elevation column is parallel with the second elevation column; wherein the first elevation column mirrors the second elevation column.

13. The feeding station according to claim 12 wherein each feeding platform includes a bowl stand and a bowl; wherein the worm collar has an internally threaded hole that is tapped with and corresponds to the worm member; wherein the worm collar fits over the worm member, and when the worm member rotates, the feeding platform moves with the worm collar along a worm length of the worm member.

14. The feeding station according to claim 13 wherein the worm collar is attached to the bowl stand; wherein the bowl stand includes a bowl recess on a top bowl stand surface; wherein the bowl recess receives and supports the bowl.

15. The feeding station according to claim 14 wherein the feeding platform is further defined as a first feeding platform and a second feeding platform.

16. The feeding station according to claim 15 wherein the one or more elevation columns are attached to the base; wherein the one or more elevation columns extend vertically with respect to the base.

\* \* \* \* \*